United States Patent [19]

Young

[11] Patent Number: 5,683,580

[45] Date of Patent: Nov. 4, 1997

[54] NONUNIFORM FORWARD ELLIPTICAL MOTION END FEED SEPARATOR

[76] Inventor: Grant A. Young, 6324 S 69 E. Pl., Tulsa, Okla. 74133

[21] Appl. No.: 656,397

[22] Filed: May 31, 1996

[51] Int. Cl.⁶ .......................... B01D 33/00; B01D 35/20; B07B 1/36
[52] U.S. Cl. .......................... 210/385; 210/389; 209/326; 209/329; 209/366.5
[58] Field of Search ........................... 210/385, 388, 210/389; 209/326, 329, 366.5

[56] References Cited

U.S. PATENT DOCUMENTS

| | | |
|---|---|---|
| 3,666,095 | 5/1972 | Krynock. |
| 4,152,255 | 5/1979 | Musschoot. |
| 4,274,953 | 6/1981 | Jackson. |
| 4,340,469 | 7/1982 | Archer. |
| 4,402,826 | 9/1983 | Uchitel. |
| 5,265,730 | 11/1993 | Norris. |
| 5,443,163 | 8/1995 | Mogensen. |

*Primary Examiner*—Thomas M. Lithgow
*Attorney, Agent, or Firm*—Frank J. Catalano; Scott R. Zingerman

[57] ABSTRACT

A vibratory deck of an end feed separator transfers material in a linear direction from the feed end to the discharge end of a screen mounted on the separator frame. A pair of rotary eccentric vibrators is independently mounted in mirror relationship on opposite sides of the frame. The eccentric vibrator shafts are centered on axes at an alpha angle to the direction of horizontal motion of the material, canted at an epsilon angle from the alpha angle and tilted about the epsilon angle from the vertical in a plane normal to the epsilon axes at opposite beta angles. The centers of the eccentric vibrator shafts are offset from the center of vibratory mass of the frame by a rho distance. The alpha, epsilon, beta and rho factors are coordinated so that the aspect ratios of the elliptical patterns of motion from the feed to the discharge ends of the screen sequentially increase or decrease. Alternatively, these factors can be coordinated so that the major axis angles of the elliptical patterns of motion from the feed to the discharge end of the screen sequentially increase or decrease in a range of from greater than 0 degrees to less than 90 degrees. In either alternative, the upper side of all of the elliptical patterns have directions of rotation extending upwardly and forwardly from the feed end toward the discharge end of the screen so that forward conveyance occurs at all points along the screen. Moreover, both alternatives can be simultaneously achieved.

26 Claims, 19 Drawing Sheets

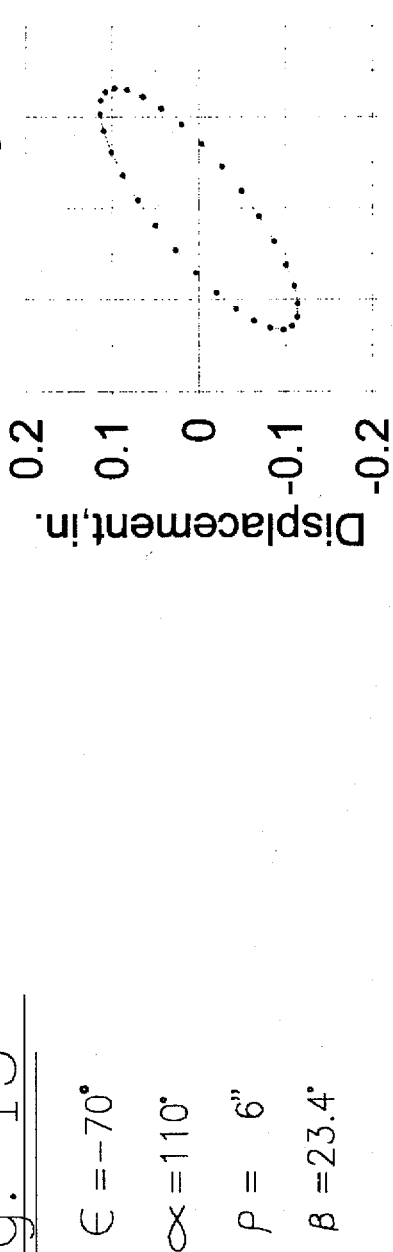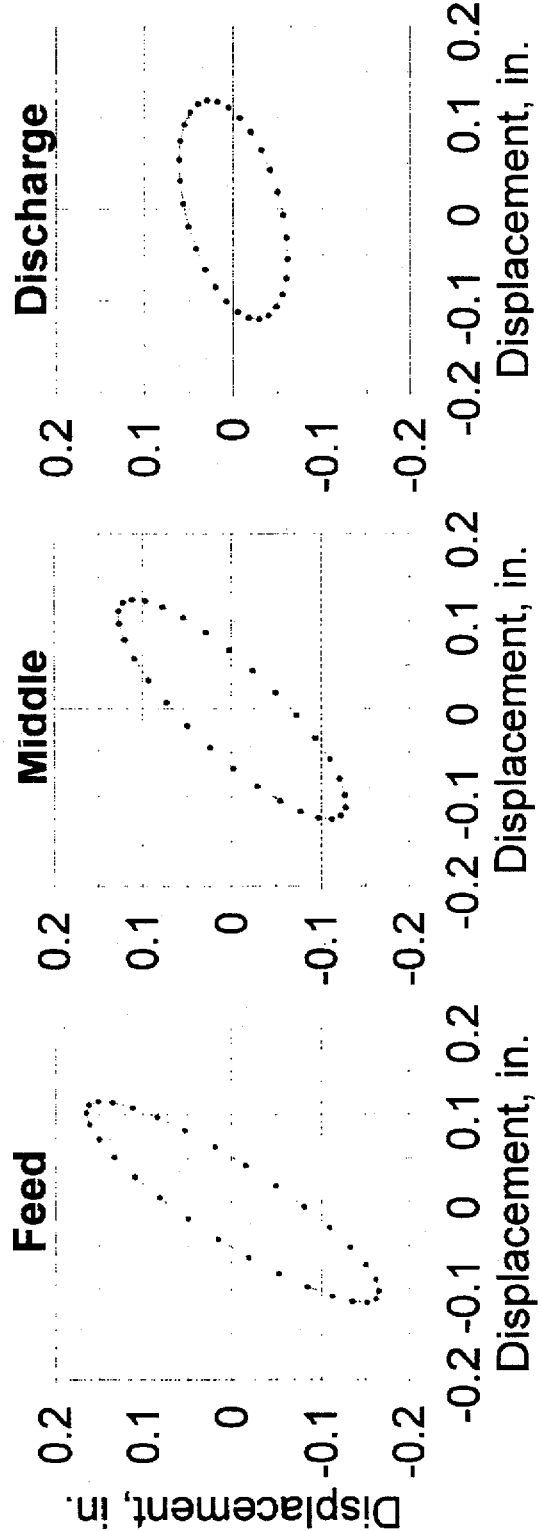
Fig. 15
$\epsilon = -70°$
$\alpha = 110°$
$\rho = 6"$
$\beta = 23.4°$ $\epsilon = 70°$
$\alpha = 340°$
$\rho = 3"$
$\beta = 23.4°$ $\epsilon = 0°$
$\alpha = 225°$
$\rho = 6"$
$\beta = 23.4$

ε = 0°
α = 225°
ρ = 12"
β = 23.4°

$\epsilon = 0°$
$\alpha = 45°$
$\rho = 8"$
$\beta = 10°$ $\epsilon = 0°$
$\alpha = 45°$
$\rho = 8"$
$\beta = 45°$

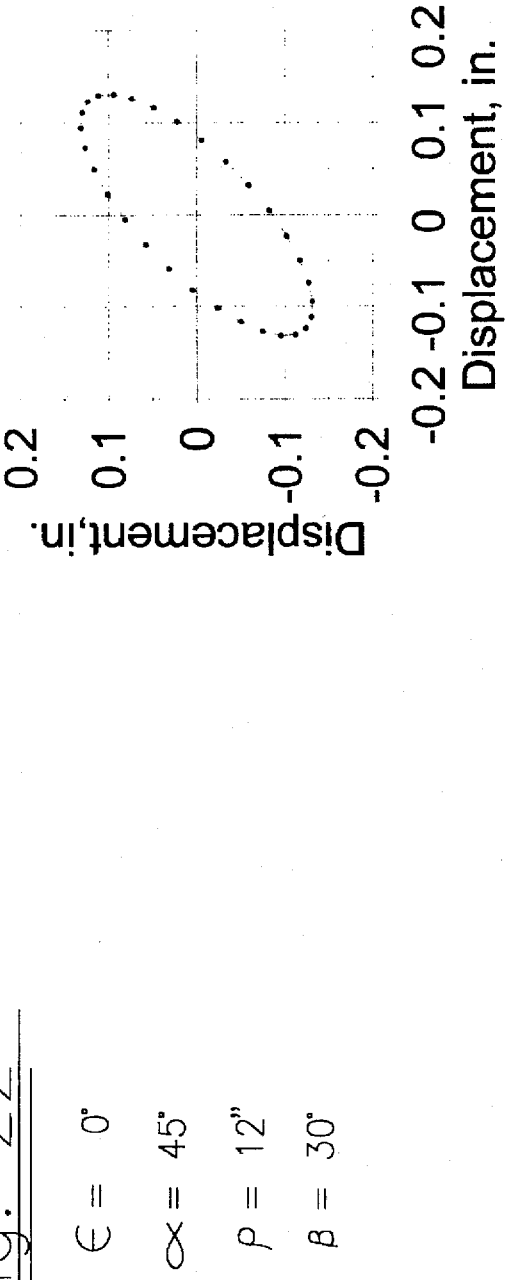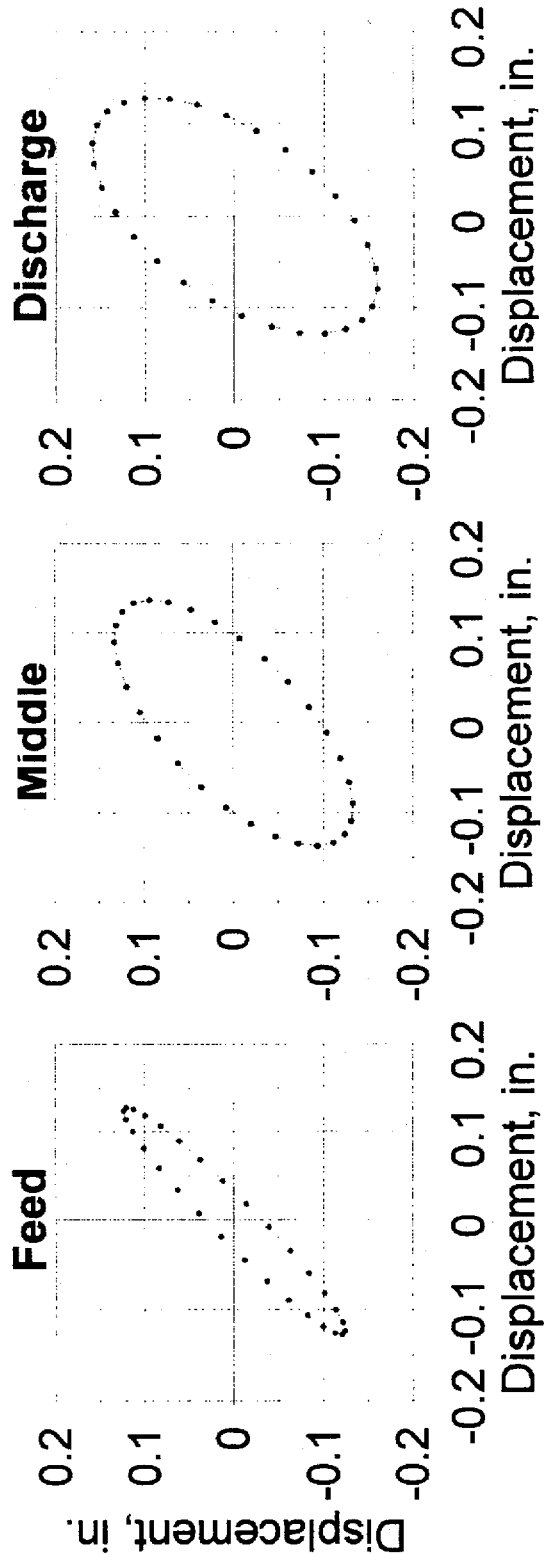
Fig. 22
$\epsilon = 0°$
$\alpha = 45°$
$\rho = 12"$
$\beta = 30°$ $\epsilon = -30°$
$\alpha = 90°$
$\rho = 12"$
$\beta = 23.4°$ $\epsilon = -10°$
$\alpha = 55°$
$\rho = 6"$
$\beta = 23.4°$ $\epsilon = 0°$
$\alpha = 45°$
$\rho = 8"$
$\beta = 23.4°$

NONUNIFORM FORWARD ELLIPTICAL MOTION END FEED SEPARATOR

BACKGROUND OF THE INVENTION

This invention relates generally to screen separators and more particularly concerns end feed screen separators using vibratory motion to achieve separation and conveyance.

The problems presently addressed can best be understood by reference to FIGS. 1 through 6 which illustrate vibratory screen separation principles as applied to the separation of solids from liquids, known patterns of motion used in such vibratory screens, typical vibrator geometry used to produce those patterns of motion and conveyance rate characteristics of certain patterns of motion.

As shown in FIG. 1, a vibratory screen V of a typical end feed separator is upwardly tilted at an angle I from the feed end F of the vibratory screen V toward its discharge end D. Mixed liquid and solid materials form a pool P at the feed end F of the vibratory screen V. The pool P provides a hydrostatic head to push the liquid L through the vibratory screen V. As the material moves from the feed end F toward the discharge end D, liquid L discharges through the screen V into a reservoir R below the screen V. The solids S which pass over the discharge end D of the vibratory screen V are thus separated from the slurry and may be received in a tank T below the discharge end D. It is well known that the separation, conveyance and life characteristics of these vibrating screens V are, to a great extent, determined by the patterns of motion applied to them.

Rotating eccentric vibrators having their independent motions coordinated by a mechanically interconnected synchronization system can impose almost any desired pattern of motion on a vibrating screen. However, such mechanical synchronization systems are expensive and require considerable maintenance.

Non-mechanically synchronized rotary eccentric vibrators will self-synchronize during operation to produce an inherent natural pattern of rotation resulting from their physical arrangement within the separator. Some known natural patterns of motion achievable by use of two non-mechanically Synchronized rotary eccentric vibrators are shown in FIG. 2 and are discussed in U.S. Pat. No. 5,265,730. The unidirectional vibratory motion of FIG. 2 can be achieved by use of the separator shown in FIGS. 3 and 4 in which two rotary eccentric vibrators E are positioned on either side of the screen frame K on an axis Y which is transverse to a reference direction X of material motion and extends through the center of vibratory mass G which includes all of the vibrating components of the separator. The shafts Q about which the weights W of the vibrators E rotate are centered on the center of vibratory mass G and axes normal to the shafts Q are displaced from the reference direction X by equal alpha angles α. As can best be seen in FIG. 4, the shafts Q can also be tilted in planes normal to the alpha axes at opposite beta angles β from the vertical V. As long as the beta angles β are zero degrees, the unidirectional linear vibratory motion of FIG. 2 will occur. As the angle of tilt, or beta angle β of the eccentric vibrator shafts Q, increases from zero degrees to ninety degrees, the naturally synchronized pattern of motion changes from linear through elliptical to circular, respectively, as shown in FIG. 2, the elliptical motion being unidirectional or on parallel major axes for all points on the vibratory screen V, such as the points A, B and C shown. By increasing the beta angle β, the lengths of the major and minor axes of the elliptical patterns are changed to vary the rate of conveyance. When the major to minor axis, or aspect, ratio approximates unity, circular motion occurs and screen life is maximized. It should be noted, however, that circular motion will not provide uphill conveyance. As the aspect ratio increases toward infinity, or linear motion, the rate of material transfer generally increases to a maximum, though some decrease occurs when linear motion is actually attained. Screen life, however, decreases. Thus, in known systems which use two independent vibrators E located at the center of vibratory mass G, a balance between conveyance rates and screen life can be achieved by varying the beta angle β. However, the entire vibratory screen V will exhibit the same material transfer rate because the patterns of motion at all points on the screen V are identical and unidirectional.

While the conveyance and life characteristics of the screen V can be established by simply selecting a suitable beta angle β, this does not produce the optimal arrangement for the overall separator process. Better and more efficient separation and drying of the material can be achieved by varying the rate of material processing from the feed end F to the discharge end D of the screen V. This will provide two desirable alternatives. Looking again at FIG. 1, the first, and most often desired, alternative is to maximize the conveyance rate of the solids S at the feed end F. This will maximize throughput of liquids L by minimizing obstruction caused by the solids S. At the discharge end D, the conveyance rate of the solids S is reduced to maximize drying time for the solids S. The second, and less often desirable, alternative is to have a slow rate of conveyance at the feed end F with a fast rate of conveyance at the discharge end D. A more open or lower aspect ratio ellipse at the feed end F would result in a slower conveyance rate and be more gentle on solids S. This would be useful for solids S which disperse into finer solids under more vigorous conveyance. Once the solids S emerge from the liquid L they would be vigorously conveyed off the screen V. Conveyance of solids S is a function of predominantly the shape and also the angle of the ellipse. Open or lower aspect ratio ellipses produce slower conveyance whereas narrow or higher aspect ratio ellipses produce rapid conveyance, as is shown in FIG. 5. The angle of the ellipse with respect to horizontal also affects the conveyance rate. Near vertical ellipses result in slower conveyance rates while ellipses tilted at 40 to 50 degrees result in faster conveyance rates. If ellipse aspect ratios and/or angles can be varied across the separator screen V, then the rate of transfer can also be varied from the feed end F to the discharge end D of the separator screen V.

As shown in FIG. 6, some patterns of multidirectional elliptical motion are presently achieved by aligning a single rotating eccentric vibrator directly over the center of vibratory mass G which, as shown on a first major axis reference line $M_1$, typically results in a reversed discharge end major axis angle so that materials are conveyed from both ends F and D toward the middle B of the screen V. Looking at a second major axis reference line $M_2$, as the single vibrator is shifted forwardly toward the discharge end D of the separator V, the reversed angle at the discharge end D is diminished. However, looking at a third major axis reference line $M_3$, when the reversed angle switches forward, the direction of rotation of the feed end F also reverses, thus resulting in conveyance of materials from the feed end F back to the source of materials. Reverse conveyance can be reversed by tilting the screen angle downhill but this reduces the liquid pool or results in the liquid L running off rather than through the screen V. None of these results are acceptable.

It is, therefore, an object of this invention to provide a non-mechanically synchronized separator using two rotary eccentric vibrators. Another object of this invention is to provide a non-mechanically synchronized end feed separator having a multidirectional and/or multi-aspect ratio elliptical pattern of motion. It is also an object of this invention to provide a non-mechanical synchronized multidirectional end feed separator in which all of the elliptical patterns of motion are inclined toward a discharge end of the separator. A further object of this invention is to provide a non-mechanically synchronized forward multi-directional end feed separator in which the feed end elliptical pattern is tilted more toward the discharge end than the discharge end elliptical pattern. Yet another object of this invention is to provide a non-mechanically synchronized decreasingly forward multi-directional end separator in which the upper side of all of the elliptical patterns rotate upwardly and forwardly toward the discharge end of the separator. Still another object of this invention is to provide a non-mechanically synchronized forward multi-directional end feed separator in which the aspect ratios of the elliptical patterns decreases from the feed end to the discharge end. And it is an object of this invention to provide a non-mechanically synchronized forward multi-directional end feed separator in which the aspect ratios of the elliptical patterns increases from the feed end to the discharge end.

SUMMARY OF THE INVENTION

In accordance with the invention, a vibratory deck for an end feed separator transfers material in a linear direction X from the feed end to the discharge end of a screen mounted on the separator frame. A pair of rotary eccentric vibrators is independently mounted in mirror relationship on opposite sides of the frame.

The shafts of the eccentric vibrators are centered on axes extending in X–Z planes at equal alpha angles $\alpha$ in relation to the direction of motion X of the material. The centers of the shafts are offset from the center of vibratory mass of the separator by a rho distance $\rho$. The shafts of the vibrators are tilted in the X–Z plane so that axes normal to the shafts and in the X–Z plane lie at equal epsilon angles s from their respective alpha axes. The epsilon angle s may be positive or negative. In addition, the shafts of the vibrators are also tilted about their epsilon axes from the vertical Z in planes normal to the epsilon axes at equal but opposite beta angles $\beta$.

The alpha $\alpha$, beta $\beta$, epsilon $\epsilon$ and rho $\rho$ factors are determined based on a computer model of the desired dynamic motion of the screen and are coordinated so that the feed end of the screen rotates in a first elliptical path having a major axis at an angle greater than 0 degrees, the center of the screen rotates in a second elliptical path having a major axis at an angle greater than the first major axis angle, the discharge end of the screen rotates in a third elliptical path having a major axis at an angle greater than the second major axis angle and less than 90 degrees and the upper side of the patterns of motion of all of the elliptical paths move upwardly and forwardly from the feed end toward the discharge end of the screen. Furthermore, the aspect ratios of the elliptical paths can be sequentially decreased or increased from the feed to the discharge end of the screen. Consequently, forward conveyance occurs at all points along the screen but at decreasing or increasing rates of conveyance from the feed to the discharge end of the screen, whichever is preferred.

The vibrators are mounted in any quadrant established by the center of vibratory mass and the direction of material motion X provided that the alpha and epsilon angles $\alpha$ and $\epsilon$ are such that the major axis angle of the elliptical path at the center of vibratory mass varies between 0 and 90 degrees and most preferably is approximately 45 degrees. In first and second quadrant embodiments, the major axis angle of the elliptical path at the center of vibratory mass is $0° < \alpha + \epsilon < 90°$. In third or fourth quadrant embodiments, the major axis angle of the elliptical path at the center of vibratory mass is $0° < \alpha - 180° + \epsilon < 90°$. In any embodiment, it is preferred that the beta angle $\beta$ be approximately 5 to 45 degrees and most preferably be 16 to 24 degrees and that the rho distance $\rho$ be greater than zero and most preferably approximately 2% to 15% of the length of the deck.

BRIEF DESCRIPTION OF THE DRAWINGS

Other objects and advantages of the invention will become apparent upon reading the following detailed description and upon reference to the drawings in which:

FIGS. 14 through 25 are diagrammatic representations of the patterns of motions achieved by practicing the present invention using a variety of vibrator positioning data.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

The manner of mounting rotating eccentric vibrators on the frame of a screen separator is well known in the art and is amply described, for example, in the aforementioned U.S. Pat. No. 5,265,730. The present invention is directed not to the manner of mounting a vibrator on a frame but to the positioning of the vibrators in relation to the center of gravity of the vibratory deck and the angular relationships of the vibrators with respect to the direction of transfer of material on the screen. Consequently, the present invention is described in reference to various stationary and moving axes according to which the positioning and angular relationships of the vibrators can be established. Those axes are diagrammatically representative of the components of the frame structure. Thus, in the figures, the frame structure is generally depicted by single line axis representation.

Figure 1:
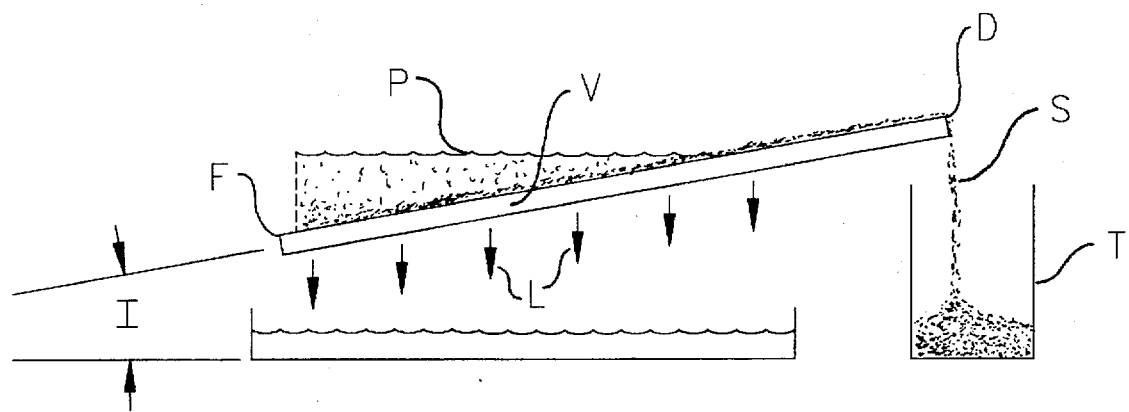
FIG. 1 is a diagrammatic representation of a typical end feed vibratory motion screen separator application.
Figure 2:
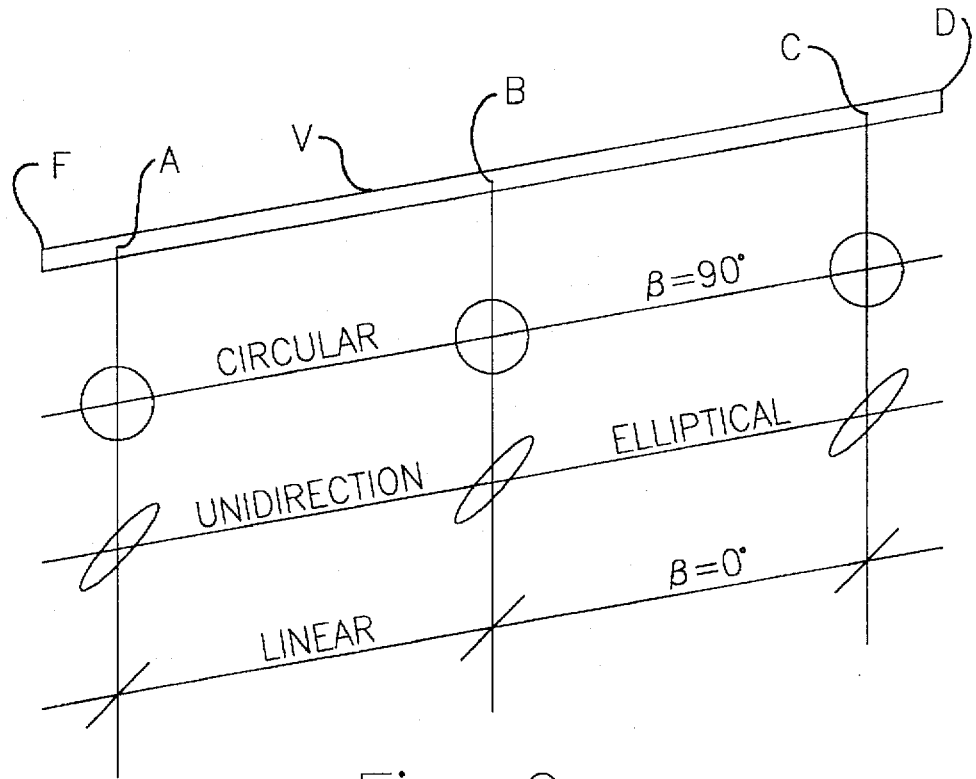
FIG. 2 is a diagrammatic representation of known patterns of motion for non-mechanically synchronized separators employing two rotary eccentric vibrators.
Figure 3:
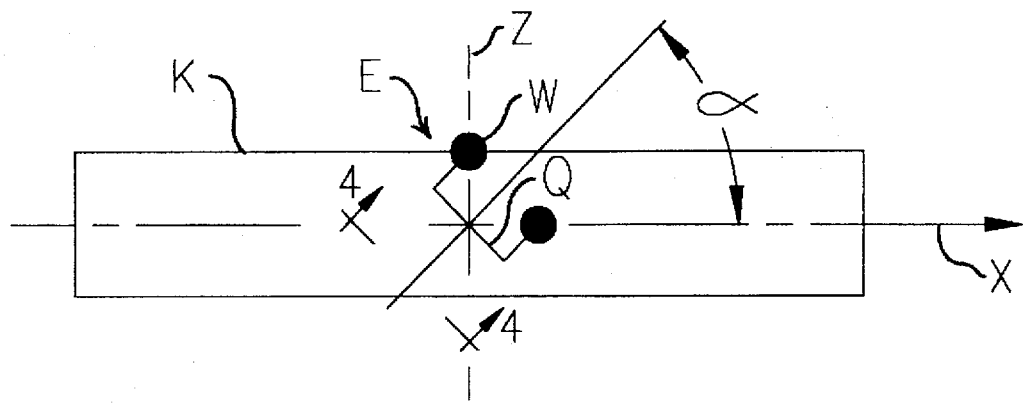
FIG. 3 is a one line diagrammatic side view of a separator capable of providing the patterns of motion of FIG. 2.
Figure 4:
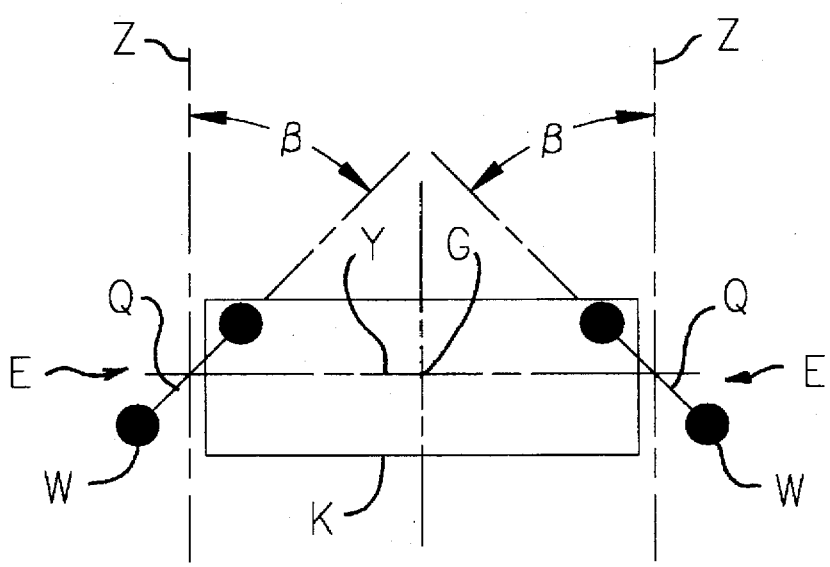
FIG. 4 is a one line diagrammatic view taken in the direction 4—4 of FIG. 3.
Figure 5:
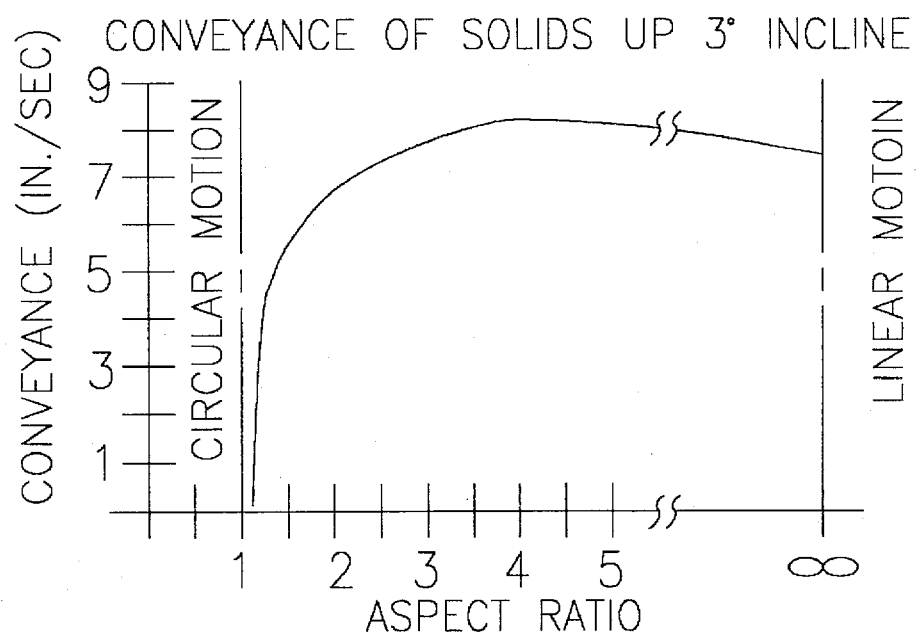
FIG. 5 is a graphic representation illustrating the effect of aspect ratio variation on conveyance rate characteristics of end feed separators.
Figure 6:
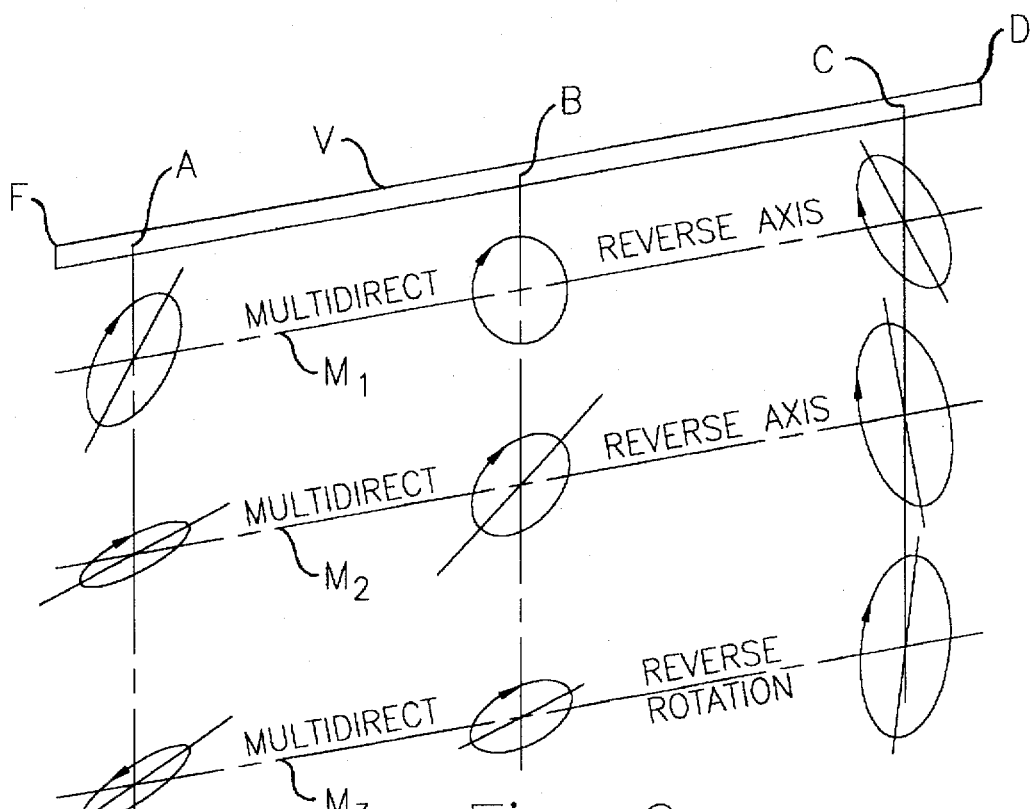
FIG. 6 is a diagrammatic representation of known patterns of motion for separators employing one rotary eccentric vibrator.
Figure 7:
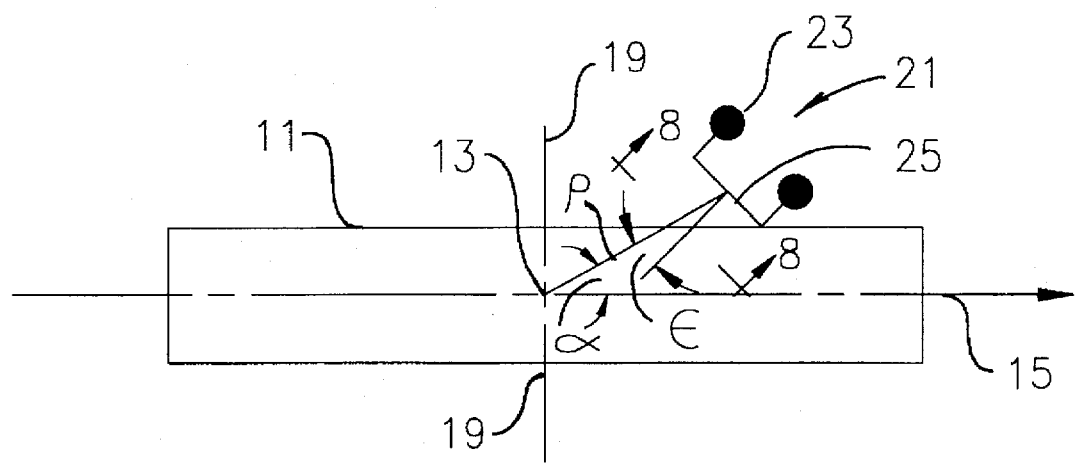
FIG. 7 is a one line diagrammatic side view of a first quadrant embodiment of the non-uniform forward elliptical motion separator according to the present invention.
Figure 8:
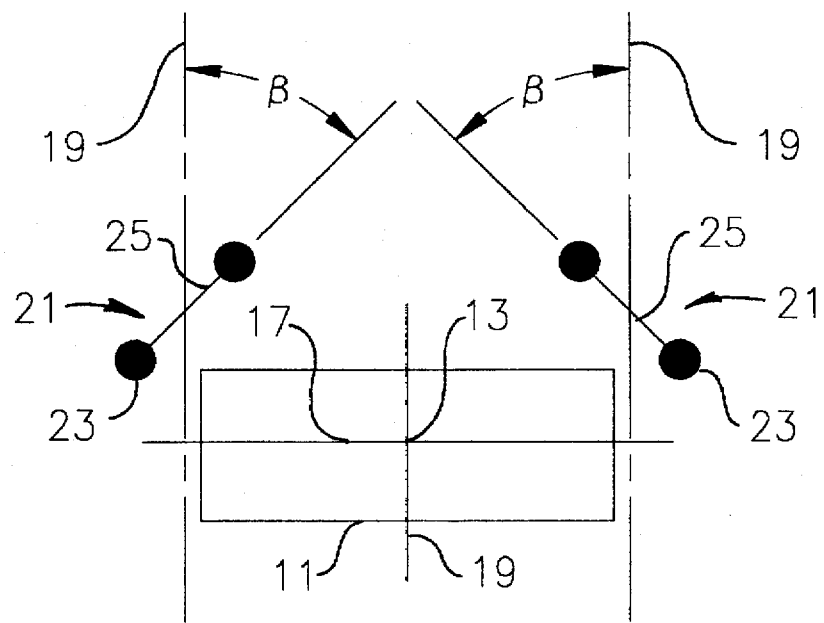
FIG. 8 is a one line diagrammatic view taken in the direction 8—8 of FIG. 7.

Turning to FIG. 7, a first quadrant embodiment of the non-uniform forward elliptical motion end feed separator includes a vibratory deck 11 having a center of vibratory mass 13. A substantially horizontal axis of transfer of material 15, which may be considered an X axis, and a transverse horizontal Y axis 17 are shown to intersect at the center of vibratory mass 13. The actual direction of material transfer 15 will not be horizontal if the screen of the deck 11 is tilted. The present coordinate system is based on using the material direction 15 as a horizontal reference. Substantially vertical Z axes 19 extend perpendicularly from the X–Y plane and are shown at various desirable points of reference. The direction of material transfer 15 and the vertical axis 19 extending through the center of vibratory mass 13 define four quadrants. Two rotating eccentric vibrators 21 are mounted on the frame of the deck 11 and in the first quadrant. As shown, each of the vibrators 21 includes a pair of counterweights 23 which rotate about its shaft 25. Each vibrator 21 is mounted so that the center of its shaft 25 is displaced from the center of vibratory mass 13 by a rho distance $\rho$. An alpha angle $\alpha$ is defined between the plane of the rho axes and the direction of material transfer 15. In the first quadrant embodiment, the alpha angle $\alpha$ will be greater than zero degrees and less than ninety degrees. The shaft 25 is further aligned so that an epsilon angle $\epsilon$ is defined between a plane normal to the shafts 25 and a plane through the alpha axes. The epsilon angle $\epsilon$ may be positive as shown or negative. The sum $\alpha+\epsilon$ of the alpha $\alpha$ and epsilon $\epsilon$ angles establishes the major axis angle with respect to the direction of material transfer 15 of the elliptical pattern of motion at the center of vibratory mass and will preferably be approximately thirty-five to fifty-five degrees and most preferably forty-five degrees. The rho distance $\rho$ will be greater than zero and most preferably be approximately two percent to fifteen percent of the length of the deck. The rho distance $\rho$ is a significant factor in establishing the aspect ratios of the elliptical patterns of motion. As shown in FIG. 8, the angular position of the vibrators 21 is further determined by a beta angle $\beta$ which is the angular tilt of the shaft 25 of the vibrator 21 in relation to the vertical 19 looking in the epsilon angle $\epsilon$ direction or in a direction normal to the shaft 25. As shown, the beta angles $\beta$ for each vibrator are the same but are oppositely tilted in relation to the vertical 19. It is preferred that the beta angle $\beta$ be approximately five to forty-five degrees and most preferably be from sixteen to twenty-four degrees. In designing the separator, the alpha, beta, epsilon and rho values will be varied in a computer program until the screen exhibits the elliptical patterns of motion desired for its application.

Figure 11:
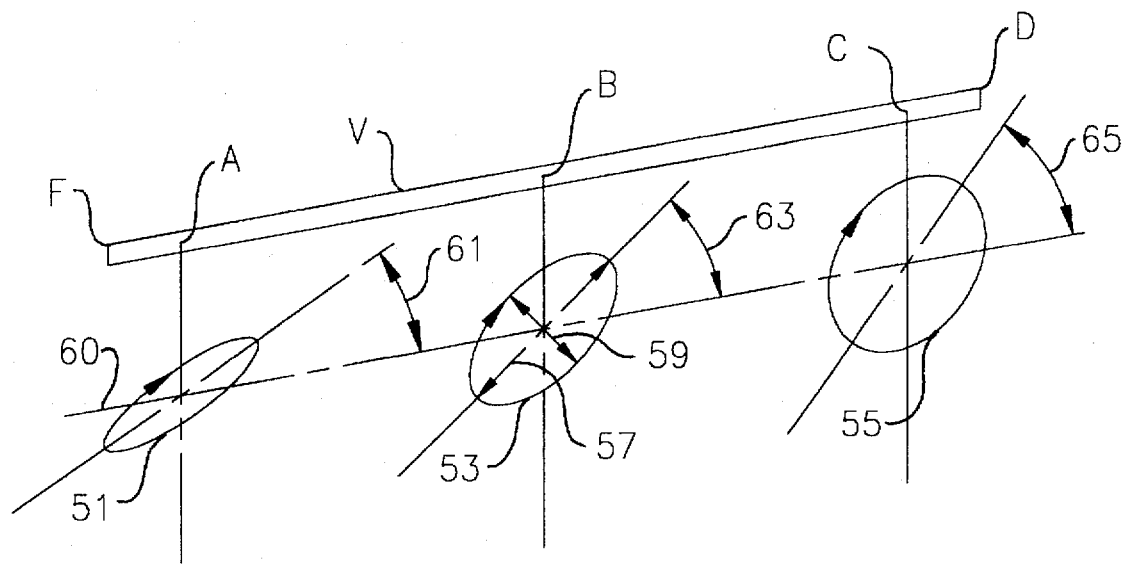
FIG. 11 is a diagrammatic representation of the patterns of motion for the non-uniform forward elliptical motion separator of FIGS. 7 and 8.

In most applications, it is preferred that the elliptical patterns will have a feed end aspect ratio greater than the center aspect ratio which is also greater than the discharge end aspect ratio. This will result in a higher liquid throughput, a longer solids drying time and allow use of a finer mesh screen. The aspect ratios between the feed and discharge ends would preferably range from 6 at the feed end to 2 at the discharge end. These preferred patterns of motion are illustrated in FIG. 11 in which point A at the feed end F of the screen B rotates in a first elliptical pattern 51 at a major axis angle 61 in relation to the major axis reference line 60. As shown, the direction of motion of the elliptical pattern 51 is upward and forward from the feed end F to the discharge end D of the screen V. The center point B of the screen V, which may be close to or identical to the center of vibratory mass, rotates in a second elliptical pattern 63 aligned on a major axis at an angle 53 with respect to the reference line 60, the second pattern major axis angle 53 being greater than the first pattern major axis angle 61. The point C at the discharge end D of the screen V rotates in a third elliptical pattern 55 aligned on a major axis disposed at an angle 65 in relation to the reference line 60 such that the third pattern major axis angle 65 is greater than the second pattern major axis angle 63. All of the patterns 51, 53 and 55 rotate in the same direction, that is, the upper side of the elliptical pattern rotates upwardly and forwardly from the feed end F to the discharge end D of the screen V. As shown, the second elliptical pattern 53 has a major axis length 57 and a minor axis length 59 which results in an aspect ratio of approximately 2.0. An aspect ratio of 2.0 to 6.0 is desirable and a center elliptical pattern having an aspect ratio of approximately 3.5 provides excellent conveyance when the pattern of motion of the center of vibratory mass has a major axis angle 63 of forty-five degrees.

Figure 9:
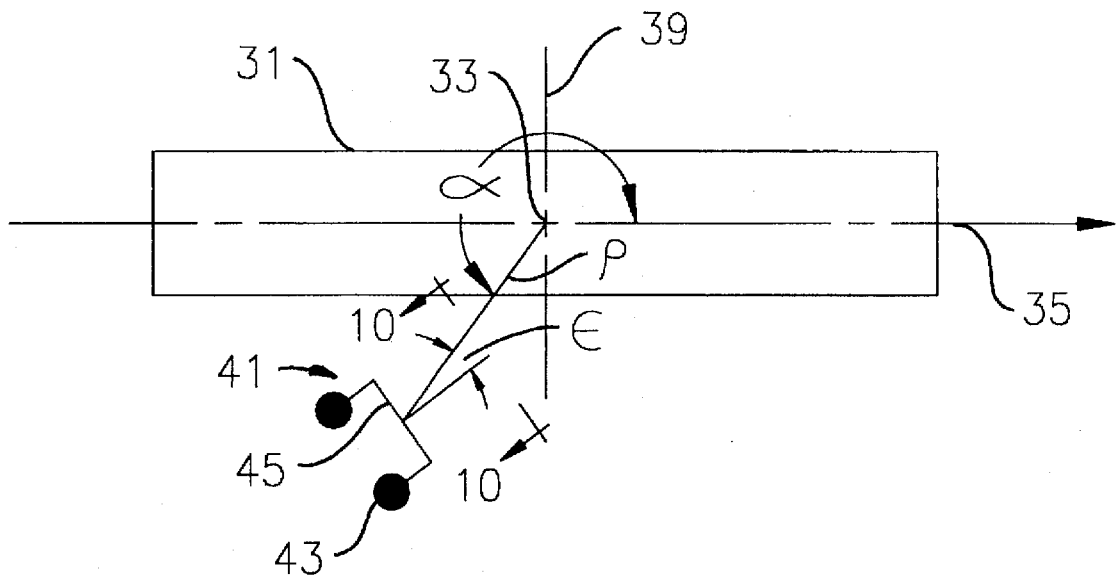
FIG. 9 is a one line diagrammatic side view of a third quadrant embodiment of the non-uniform forward elliptical motion separator according to the present invention.
Figure 10:
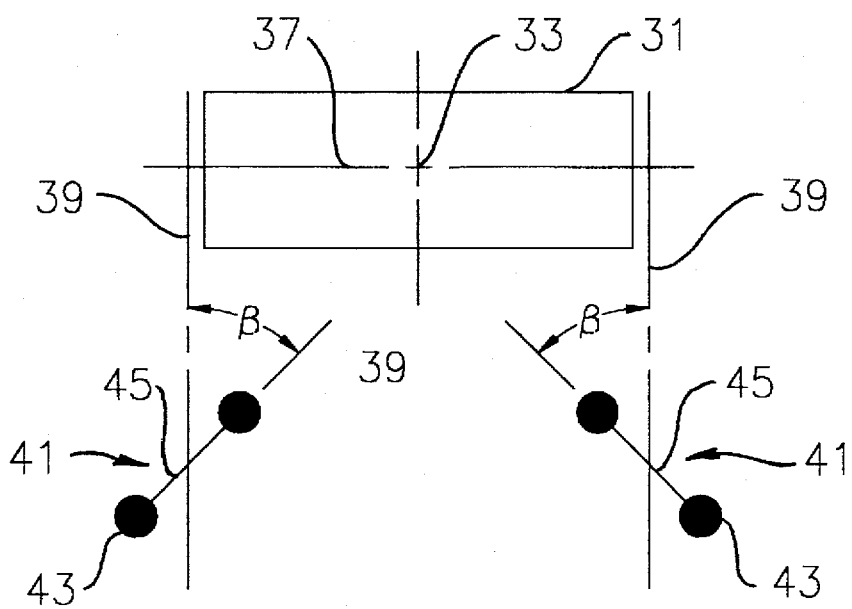
FIG. 10 is a one line diagrammatic view taken in the direction 10—10 of FIG. 9.

Turning to FIG. 9, a third quadrant embodiment of the non-uniform forward elliptical motion end feed separator includes a vibratory deck 31 having a center of vibratory mass 33. The axis of transfer of material 35 and a transverse horizontal Y axis 37 intersect at the center of vibratory mass 33. Vertical axes 39 extend perpendicularly from the X–Y plane and are shown at various desirable points of reference. The direction of material transfer 35 and the vertical axis 39 extending through the center of vibratory mass 33 define four quadrants. Two rotating eccentric vibrators 41 are mounted on the frame of the deck 31 in the third quadrant. As shown, each of the vibrators 41 includes a pair of counterweights 43 which rotate about its shaft 45. Each vibrator 41 is mounted so that the center of its shaft 45 is displaced from the center of vibratory mass 33 by a rho distance $\rho$. An alpha angle $\alpha$ is defined between the rho axis and the direction of material transfer 35. In the third quadrant embodiment, the alpha angle $\alpha$ will be greater than 180 degrees and less than 270 degrees. The shaft 45 is further aligned so that an epsilon angle $\epsilon$ is defined between an axis normal to the shaft 45 and the alpha axis. The epsilon angle $\epsilon$ may be positive as shown or negative. The sum $\alpha-180°+\epsilon$ establishes the major axis angle of the ellipse at the center of vibratory mass for third and fourth quadrant implementations with respect to the direction of material transfer 35 and will preferably be approximately 35 to 55 degrees and most preferably 45 degrees. The rho distance $\rho$ will be greater than zero and most preferably be approximately two percent to fifteen percent of the length of the deck. As shown in FIG. 10, the angular position of the vibrators 41 is further determined by a beta angle $\beta$ which is the angular tilt of the shaft 45 of the vibrator 41 in relation to the vertical 39 looking in the epsilon angle $\epsilon$ direction or in a direction normal to the shaft 45. As shown, the beta angles $\beta$ for each vibrator are the same but are oppositely tilted in relation to the vertical 39. It is preferred that the beta angle $\beta$ be approximately five to forty-five degrees and most preferably be from sixteen to twenty-four degrees. In designing the separator, the alpha, beta, epsilon and rho values will be varied in a computer program until the screen exhibits the elliptical patterns of motion desired for its application. The aspect ratio and major axis angular relationships of the patterns of motion illustrated in FIG. 11 are applicable to the first and fourth quadrant embodiments of the separator but second and third quadrant embodiments will result in increasing aspect ratios from feed end F to discharge end D.

Figure 12:
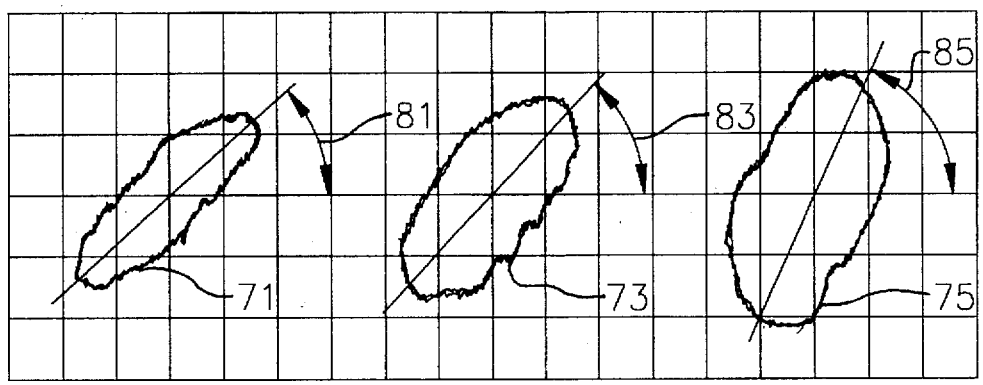
FIG. 12 is an oscilloscopic display of the patterns of motion achieved by practicing the present invention.

Turning now to FIG. 12, there is shown a copy of an oscilloscopic display of the patterns of motion achieved by practicing a first quadrant application of the present invention. As shown, the screen exhibited a feed end major axis angle 71 of approximately forty-three degrees, a center major axis angle 73 of approximately 47 degrees and a discharge end major axis angle 75 of approximately 61 degrees. The aspect ratios of the feed, center and discharge point patterns are 3.7, 2.2 and 2.0, respectively.

Figure 13:
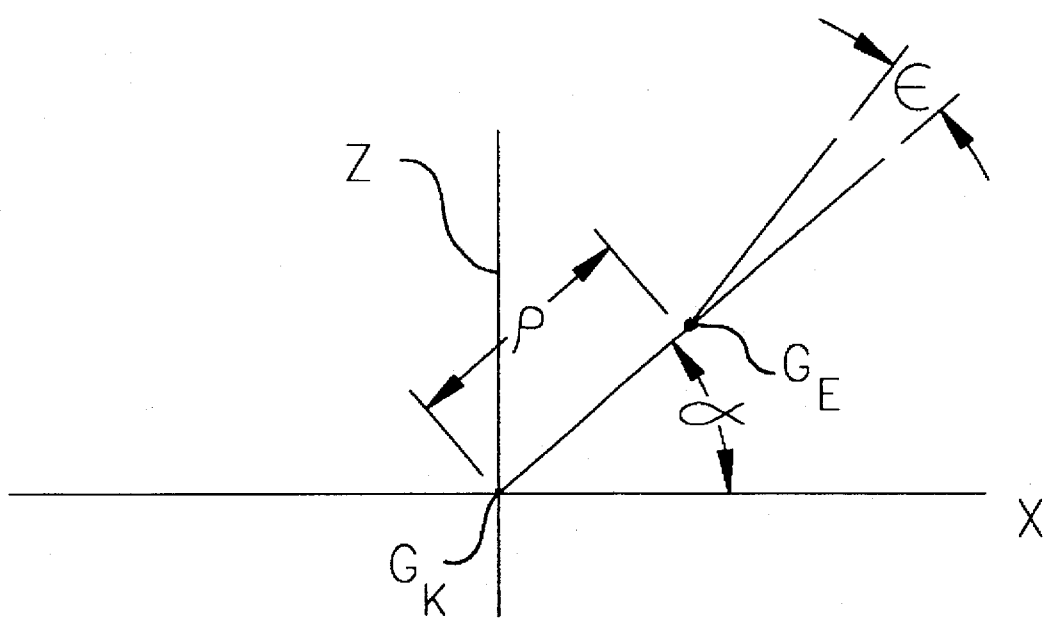
FIG. 13 is a graphic representation of the coordinate system used in practicing the present invention.

The manner of practicing the invention can best be understood in relation to FIGS. 13 through 25. Looking at FIG. 13, three of the four screen criteria are illustrated including the alpha and epsilon angles $\alpha$ and $\epsilon$ and the rho distance $\rho$. As shown, the center of the vibrator shaft $G_E$ is located in the first quadrant in relation to the center of vibratory mass $G_K$ and the X axis passing through the center of vibratory mass $G_K$ in the direction of material transfer. The alpha angle $\alpha$ is between the X axis and a plane intersecting the center of vibratory mass $G_K$ and the centers $G_E$ of the vibrator shafts. The epsilon angle $\epsilon$, which as shown is a positive angle, is between the alpha angle plane and a plane normal to the shafts of the vibrators. The rho distance $\rho$ is the distance between an axis extending through the center of vibratory mass $G_K$ and transverse to the X-Z plane and the centers $G_E$ of the vibrator shafts. The beta angle $\beta$ is defined as explained in relation to FIG. 8.

Figure 14:
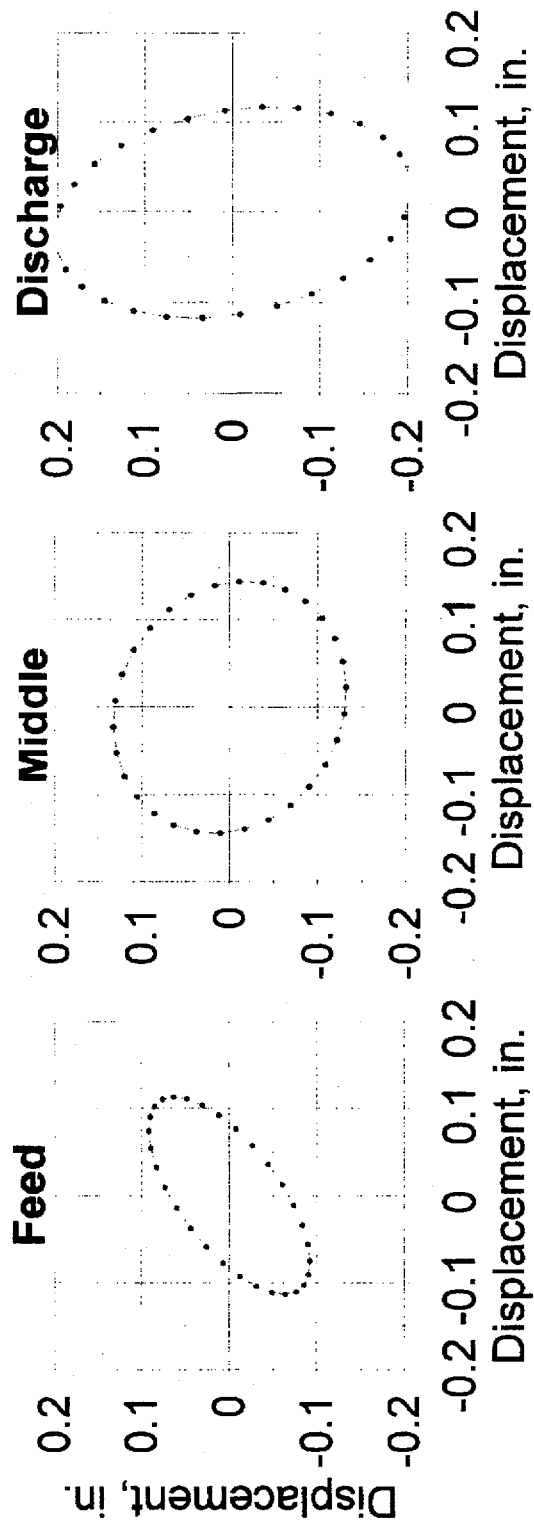

Given the above understanding of coordinates, FIG. 14 demonstrates that application of the principles of the present invention confirms prior art shortcomings. That is, when the beta angle $\beta$ is 90 degrees, circular motion occurs. As the rho distance $\rho$ is increased from zero, multi-directional elliptical patterns of motion occur. However, not all of the patterns of motion are in the forward direction for all points on the screen.

FIG. 15 illustrates an application of the present invention having an epsilon angle $\epsilon$ of −70 degrees, an alpha angle $\alpha$ of 110 degrees, a rho distance $\rho$ of 6 inches and a beta angle $\beta$ of 23.4 degrees. $\alpha+\epsilon$ is therefore 40 degrees, as is substantiated by the elliptical pattern of the center of vibratory mass of the vibrator. The result is a second quadrant vibrator arrangement displaying decreasing alpha angles and decreasing aspect ratios for the patterns of motion from the feed to the discharge ends of the vibrator.

Figure 16:
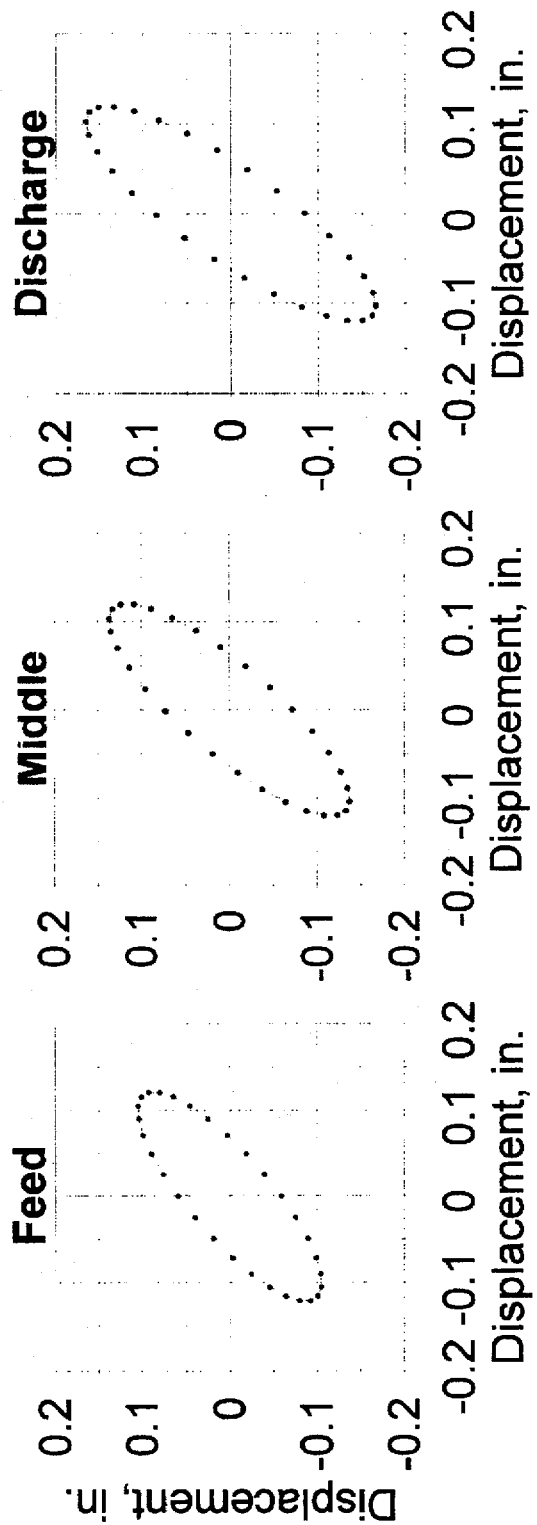

In FIG. 16, the epsilon angle $\epsilon$ is 70 degrees, the alpha angle $\alpha$ is 340 degrees, the rho distance $\rho$ is 3 inches and the beta angle $\beta$ is again 23.4 degrees. This results in a fourth quadrant embodiment in which the alpha angle and aspect ratio of the patterns of motion increases from the feed to the discharge end of the vibrator. Thus, FIGS. 15 and 16 taken together demonstrate capability of the present invention to either increase or decrease the alpha angle and aspect ratios.

Figure 17:
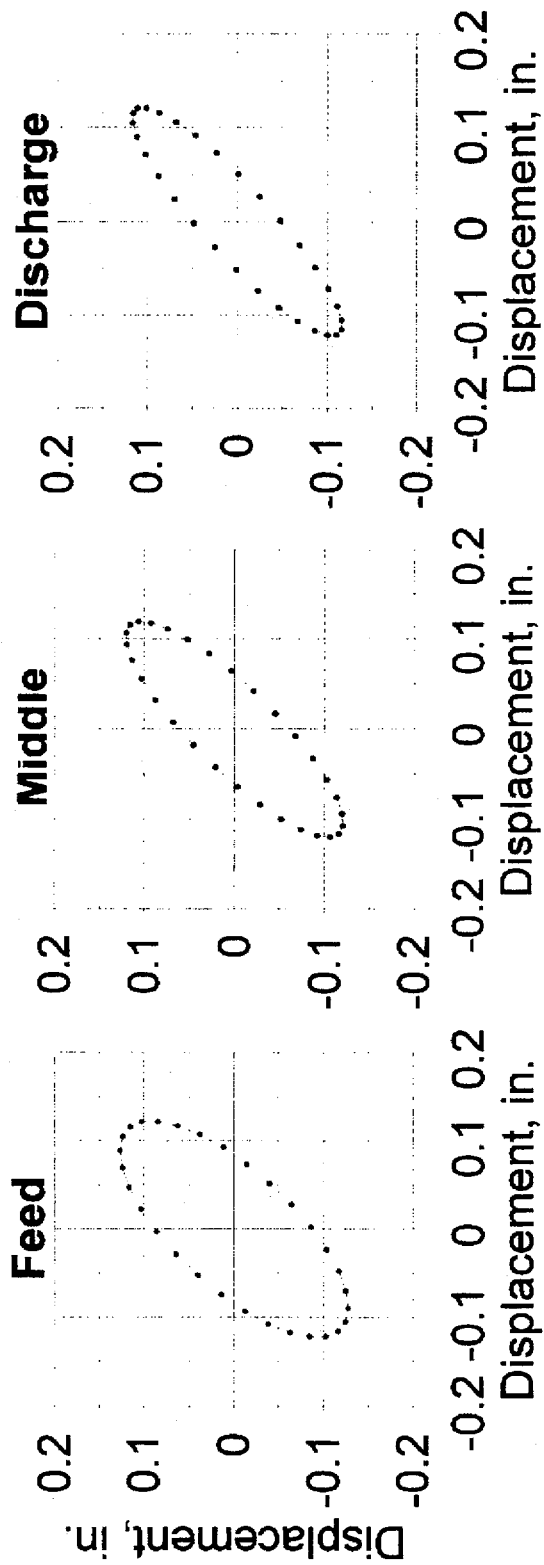

Looking at FIG. 17 in comparison with FIG. 14, by bringing the beta angle $\beta$ between zero and 90 degrees and preferably to 23.4 degrees, multi-directional forward elliptical motion can be achieved using the present invention. In particular, FIG. 17 shows that multi-directional forward elliptical motion can be achieved in which the rate of conveyance increases from the feed to the discharge end of the vibrator.

Figure 18:
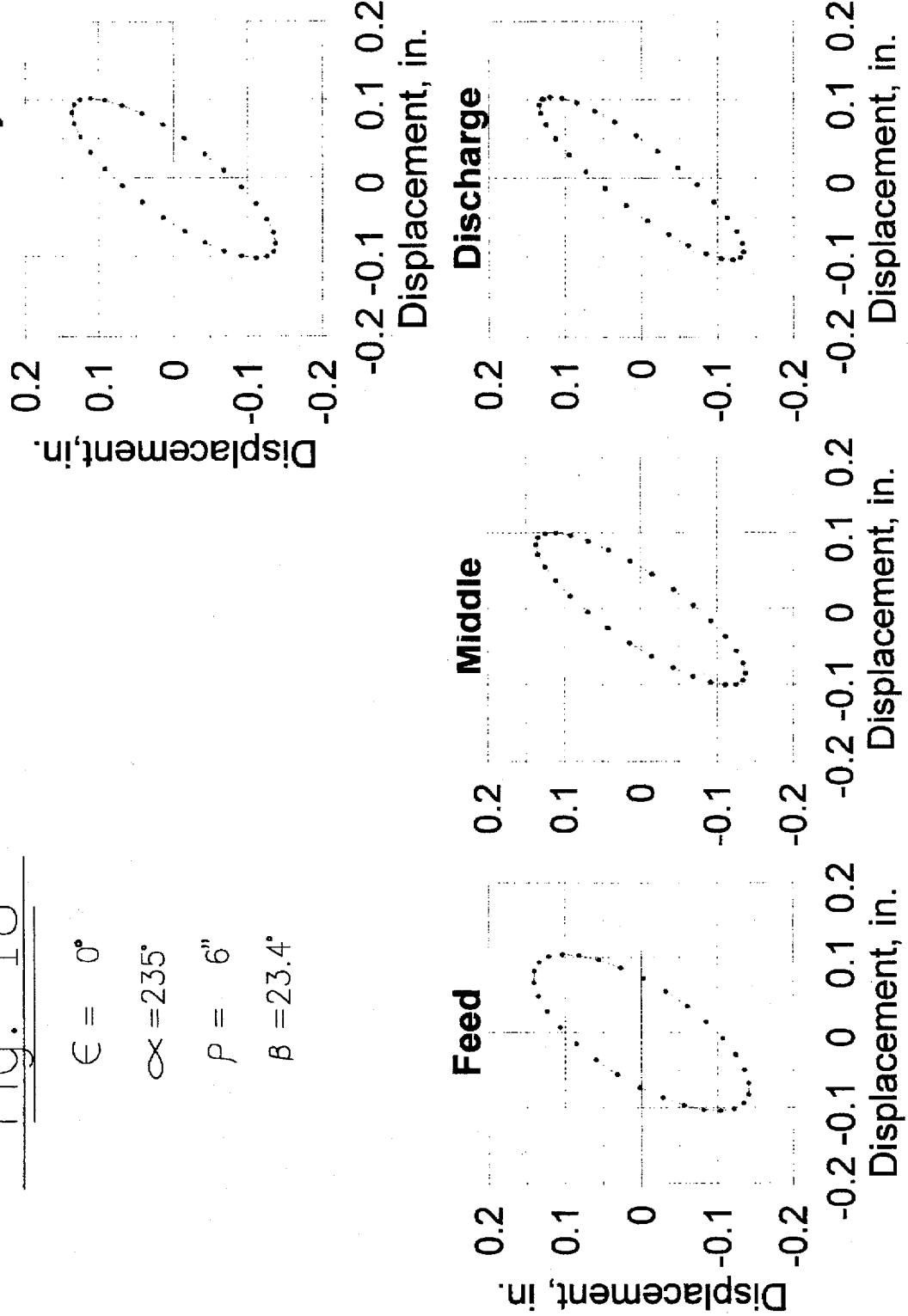
Figure 19:
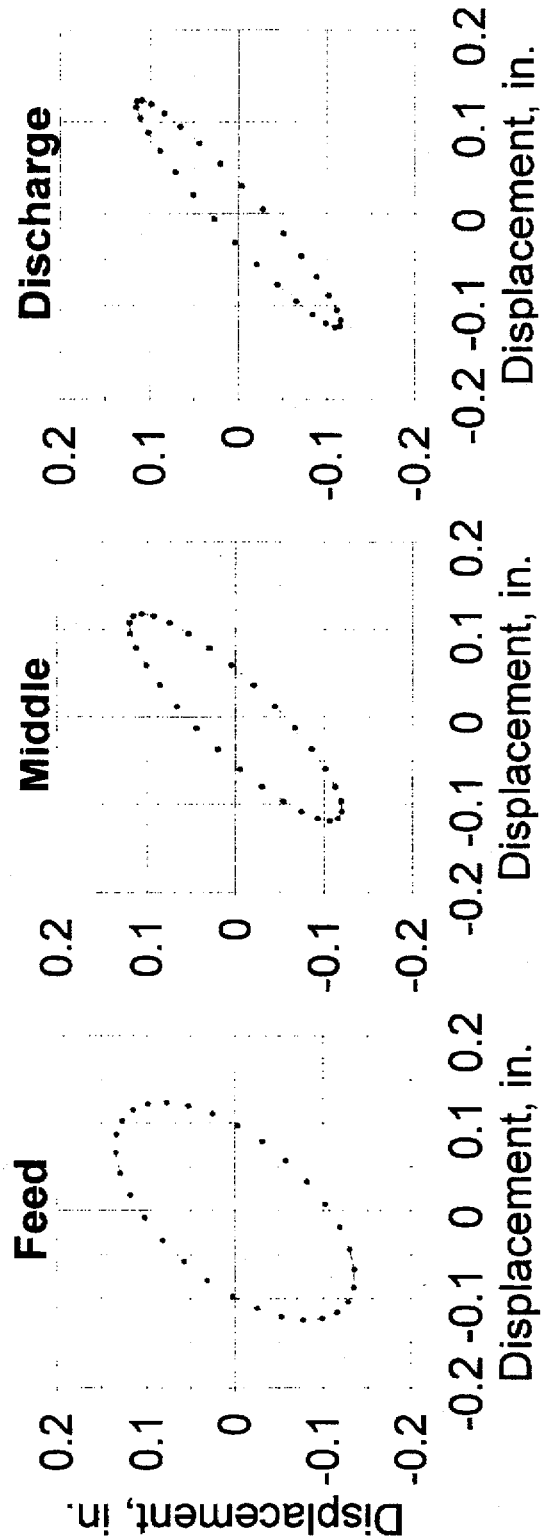

As shown in FIG. 18, by increasing $\alpha$−180°+$\epsilon$, the rate of conveyance can be reduced at all points on the vibrator. Comparing FIG. 19 with FIG. 17, by increasing the rho distance $\rho$, the overall difference in rates of conveyance from the feed end to the discharge end of the vibrator can be increased.

Figure 20:
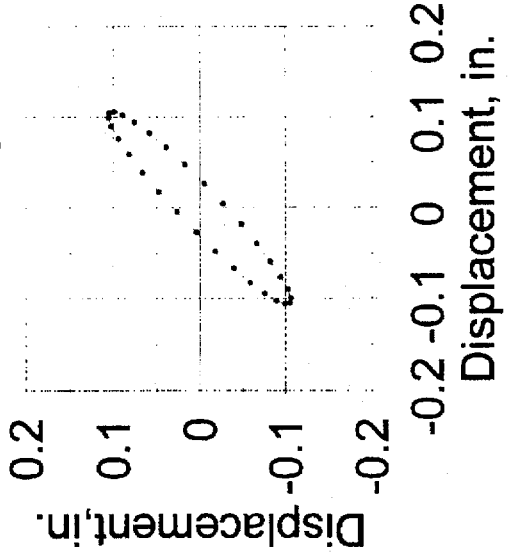
Figure 21:
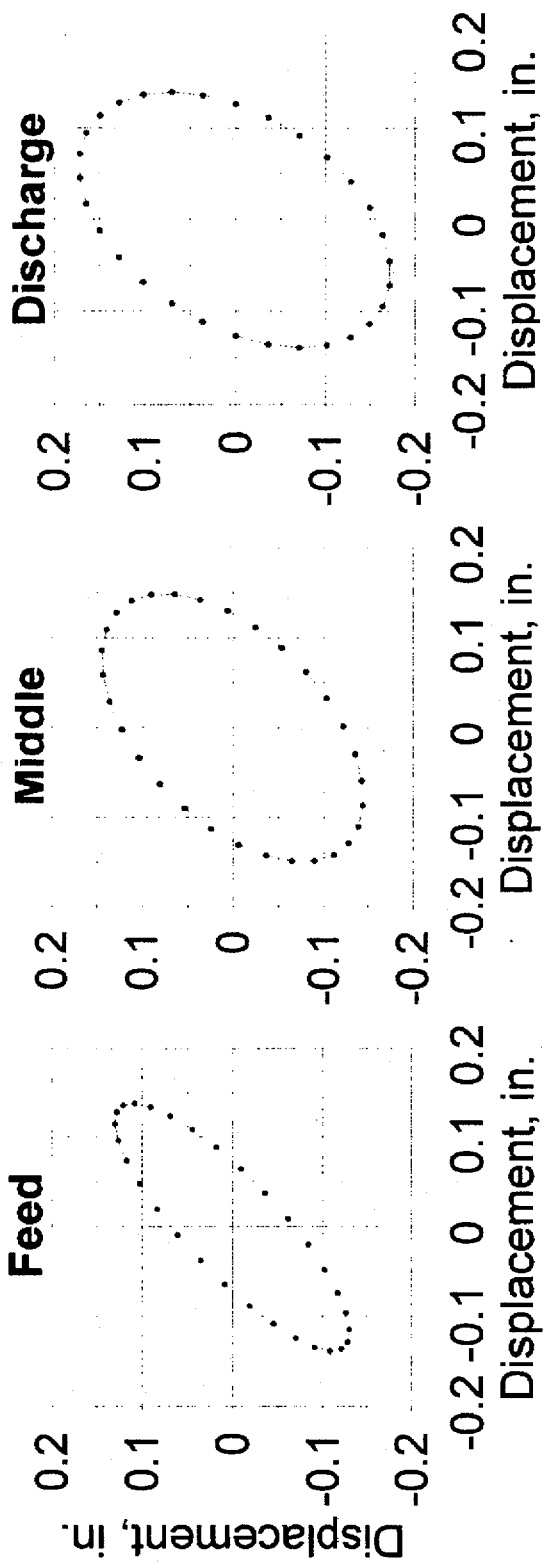

FIG. 20 demonstrates that lower beta angles $\beta$ result in higher aspect ratios for all points along the screen while FIG. 21 demonstrates that higher beta angles $\beta$ result in lower aspect ratios for all points along the screen. FIG. 22 shows that, by appropriate variation of the beta angle $\beta$ and the rho distance $\rho$, an intermediate range of aspect ratios can be achieved from the feed to the discharge end of the screen which will also provide a large difference in the rate of conveyance from one end of the screen to the other.

Figure 23:
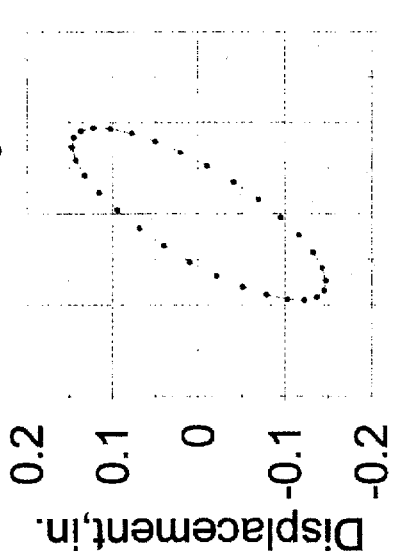
Figure 24:
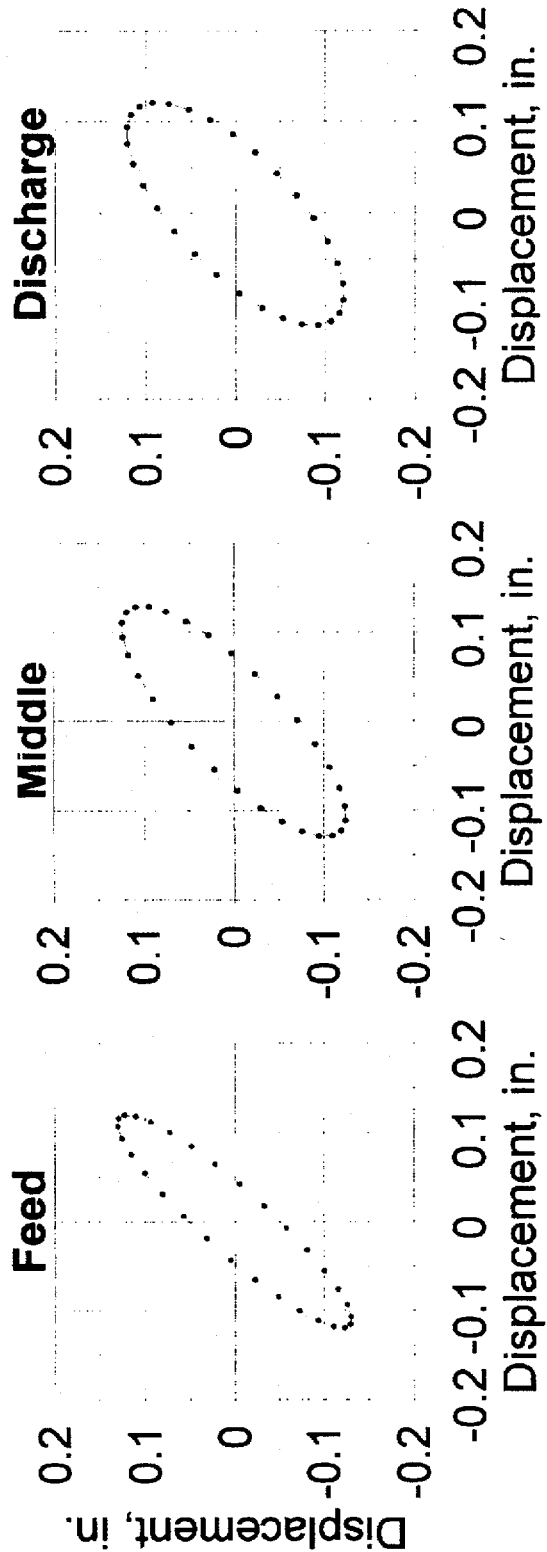
Figure 25:
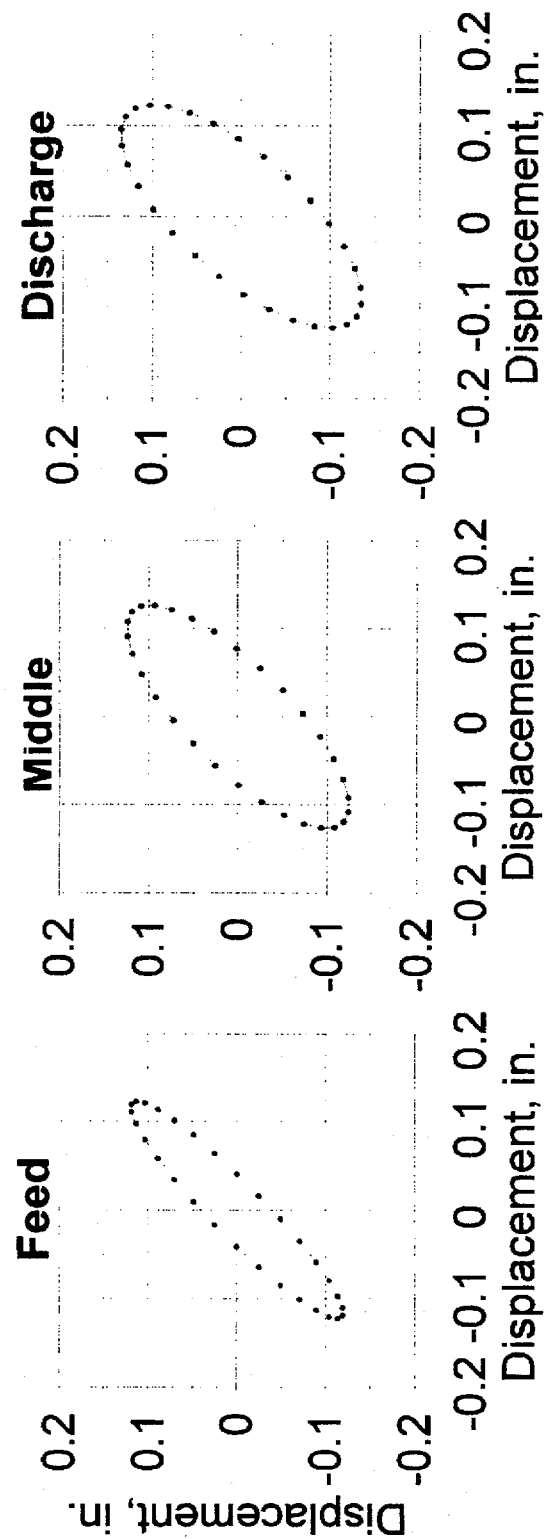

Looking at FIG. 23, the relation of the alpha and epsilon angles $\alpha$ and $\epsilon$ to the angular position of the elliptical path at the center of vibratory mass is evident. The impact of a high rho distance $\rho$ on the aspect ratios across the length of the screen is also apparent. Given the above interrelationship of characteristics, FIG. 24 illustrates the patterns of motion for a vibrator having an epsilon angle $\epsilon$ of −10 degrees, an alpha angle $\alpha$ of 55 degrees, a rho distance $\rho$ of 6 inches and a beta angle $\beta$ of 23.4 degrees. As shown, this configuration provides multi-directional motion from the feed to the discharge ends of the vibrator and a significant decrease in the aspect ratio of the patterns of motion from the feed to the discharge ends of the vibrator. For the general purpose of achieving higher conveyance rates at the feed end and lower discharge rates and greater drying time at the discharge end of the vibrator, this configuration is very efficient. Looking at FIG. 25, a similar result can be achieved by increasing the epsilon angle $\epsilon$ to zero, reducing the alpha angle $\alpha$ to 45 degrees and increasing the rho distance $\rho$ by 2 inches. As expected, the greater rho distance $\rho$ accentuates the change in aspect ratios from the feed end to the discharge end of the screen.

Thus, it is apparent that there has been provided, in accordance with the invention, a non-uniform forward elliptical motion end feed separator that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A vibratory deck for a separator comprising:

a frame;

a screen mounted on said frame for motion therewith to transfer material in a linear direction from a feed end to a discharge end of said screen; and a pair of rotary eccentric vibrators independently mounted in mirror relationship on opposite sides of said frame, said vibrators having shafts centered on a horizontal axis transverse to said linear direction and displaced from a center of vibratory mass of said frame and said screen by a rho distance on a radial plane at an alpha angle with respect to said linear direction, said shafts being canted in planes transverse to said horizontal axis at an epsilon angle between said radial plane and a plane normal to said shafts and being tilted in a plane transverse to said normal plane at equal and opposite beta angles, a sum of said alpha and epsilon angles being greater than 0° and less than 90° when said alpha angle is less than 180° and greater than 180° and less than 270° when said alpha angle is greater than 180°, said beta angle being greater than 0° and less than 90° degrees and said rho distance being not equal to zero inches, said alpha, epsilon and beta angles and said rho distance being coordinated so that sequential points from said feed end to said discharge end of said screen rotate in elliptical patterns having sequentially graduated aspect ratios, an upper side of all of said elliptical patterns having directions of rotation extending upwardly and forwardly from said feed end to said discharge end of said screen.

2. A deck according to claim 1, said aspect ratios decreasing from said feed end to said discharge end of said screen.

3. A deck according to claim 2, said aspect ratios decreasing over an approximate range of from 6.0 to 2.0.

4. A deck according to claim 2, said sum of said alpha and epsilon angles being approximately 45° when alpha is less than 180° and approximately 225° when alpha is greater than 180°.

5. A deck according to claim 2, said beta angle being approximately 5° to 45°.

6. A deck according to claim 2, said beta angle being approximately 16° to 24°.

7. A deck according to claim 2, said rho distance being approximately 2% to 15% of a length of the deck.

8. A deck according to claim 1, said aspect ratios increasing from said feed end to said discharge end of said screen.

9. A deck according to claim 8, said aspect ratios increasing over an approximate range of from 2.0 to 6.0.

10. A deck according to claim 8, said sum of said alpha and epsilon angles being approximately 45° when alpha is less than 180° and approximately 225° when alpha is greater than 180°.

11. A deck according to claim 8, said beta angle being approximately 5° to 45°.

12. A deck according to claim 8, said beta angle being approximately 16° to 24°.

13. A deck according to claim 8, said rho distance being approximately 2% to 15% of a length of the deck.

14. A vibratory deck for a separator comprising:

a frame;

a screen mounted on said frame for motion therewith to transfer material in a linear direction from a feed end to a discharge end of said screen; and a pair of rotary eccentric vibrators independently mounted in mirror relationship on opposite sides of said frame, said vibrators having shafts centered on a horizontal axis transverse to said linear direction and displaced from a center of vibratory mass of said frame and said screen by a rho distance on a radial plane at an alpha angle with respect to said linear direction, said shafts being canted in planes transverse to said horizontal axis at an epsilon angle between said radial plane and a plane normal to said shafts and being tilted in a plane transverse to said normal plane at equal and opposite beta angles, a sum of said alpha and epsilon angles being greater than 0° and less than 90° when said alpha angle is less than 180° and greater than 180° and less than 270° when said alpha angle is greater than 180°, said beta angle being greater than 0° and less than 90° degrees and said rho distance being not equal to zero inches, said alpha, epsilon and beta angles and said rho distance being coordinated so that sequential points from said feed end to said discharge end of said screen rotate in elliptical patterns having sequentially graduated major axis angles, an upper side of all of said elliptical patterns having directions of rotation extending upwardly and forwardly from said feed end to said discharge end of said screen.

15. A deck according to claim 14, said major axis angles decreasing from said feed end to said discharge end of said screen.

16. A deck according to claim 15, said major axis angles decreasing over an approximate range of from 61° to 43°.

17. A deck according to claim 15, said sum of said alpha and epsilon angles being approximately 45° when alpha is less than 180° and approximately 225° when alpha is greater than 180°.

18. A deck according to claim 15, said beta angle being approximately 5° to 45°.

19. A deck according to claim 15, said beta angle being approximately 16° to 24°.

20. A deck according to claim 15, said rho distance being approximately 2% to 15% of a length of the deck.

21. A deck according to claim 14, said major axis angles increasing from said feed end to said discharge end of said screen.

22. A deck according to claim 21, said major axis angles increasing over an approximate range of from 43° to 61°.

23. A deck according to claim 21, said sum of said alpha and epsilon angles being approximately 45° when alpha is less than 180° and approximately 225° when alpha is greater than 180°.

24. A deck according to claim 21, said beta angle being approximately 5° to 45°.

25. A deck according to claim 21, said beta angle being approximately 16° to 24°.

26. A deck according to claim 21, said rho distance being approximately 2% to 15% of a length of the deck.

* * * * *